(12) United States Patent
Sanchez Navarro

(10) Patent No.: US 11,010,107 B2
(45) Date of Patent: May 18, 2021

(54) METHOD FOR CONTROLLING IMAGE-PROCESSING DEVICES AND FACILITY FOR CARRYING OUT SUCH METHOD

(71) Applicant: Nube Print, S.L., Madrid (ES)

(72) Inventor: Antonio Sanchez Navarro, Madrid (ES)

(73) Assignee: Nube Print, S.L.

( * ) Notice: Subject to any disclaimer, the term of this patent is extended or adjusted under 35 U.S.C. 154(b) by 0 days.

(21) Appl. No.: 16/496,580

(22) PCT Filed: Mar. 30, 2017

(86) PCT No.: PCT/ES2017/070186
§ 371 (c)(1),
(2) Date: Sep. 23, 2019

(87) PCT Pub. No.: WO2018/178408
PCT Pub. Date: Oct. 4, 2018

(65) Prior Publication Data
US 2020/0042259 A1    Feb. 6, 2020

(51) Int. Cl.
*G06F 3/12*    (2006.01)
(52) U.S. Cl.
CPC .......... *G06F 3/1206* (2013.01); *G06F 3/1225* (2013.01); *G06F 3/1255* (2013.01)
(58) Field of Classification Search
CPC .... G06F 3/1206; G06F 3/1255; G06F 3/1225; G06F 3/1288; G06F 3/1218; G06F 3/1229; G06K 15/4075; H04N 1/00832; H04N 1/00344; G03G 15/00
See application file for complete search history.

(56) References Cited

U.S. PATENT DOCUMENTS

| | | | |
|---|---|---|---|
| 5,729,223 A * | 3/1998 | Trissel | G06T 9/005 341/51 |
| 5,802,420 A | 9/1998 | Garr et al. | |
| 9,063,682 B1 * | 6/2015 | Bradshaw | G06F 3/1292 |
| 2005/0055641 A1 * | 3/2005 | Machida | H04L 41/22 715/734 |
| 2010/0247132 A1 * | 9/2010 | Shustef | G06Q 30/0601 399/79 |

(Continued)

FOREIGN PATENT DOCUMENTS

| | | |
|---|---|---|
| DE | 10351740 | 10/2004 |
| WO | 2015061787 | 4/2015 |
| WO | 2015102793 | 7/2015 |

*Primary Examiner* — Huo Long Chen
(74) *Attorney, Agent, or Firm* — Lorraine Hernandez; Kegler, Brown, Hill & Ritter Co., LPA (57) ABSTRACT

A procedure and installation of the same for the control of image processing devices using only the data required; thus, avoiding saturation of the memories of the components involved and/or the communications bandwidth. The procedure and installation are simple and reliable such as not to require the involvement of an expert user or a service staff member. The procedure includes the standardization of the data identifiers for each image processing device via the identification of the identifier containing a value for each data point and checking that the scale of each data point is equivalent to a predetermined scale. The installation includes a standardization system for such purpose.

12 Claims, 3 Drawing Sheets

(56) References Cited

U.S. PATENT DOCUMENTS

| | | | |
|---|---|---|---|
| 2012/0188602 A1* | 7/2012 | Shirai | H04L 41/12 358/1.15 |
| 2015/0003847 A1 | 1/2015 | Yang et al. | |
| 2016/0216919 A1* | 7/2016 | Zakharov | G06F 3/1288 |
| 2016/0216925 A1* | 7/2016 | Mizuta | G06K 15/402 |
| 2017/0223127 A1* | 8/2017 | Matsutani | H04N 1/00344 |

* cited by examiner

METHOD FOR CONTROLLING IMAGE-PROCESSING DEVICES AND FACILITY FOR CARRYING OUT SUCH METHOD

This application is the U.S. national phase entry of and claims priority to International Application PCT/ES2017/070186, filed on Mar. 30, 2017, herein incorporated by reference.

TECHNICAL FIELD OF THE INVENTION

This invention falls within the field of the control of image processing devices, such as printers, for example.

BACKGROUND OF THE INVENTION

An image processing device can be a printer, a copier, a fax machine, a wide or narrow format plotter, a multifunctional printing device combining two or more of the previous devices or a 3D printer.

Currently there are controls, both procedures and installations, that cover all or most of the data available on image processing devices, which in most cases exceeds a total of 1000 data fields, which usually saturates the memories of the elements involved as well as the communications bandwidth, with most of this data being unnecessary.

Said controls usually have a control device and an intermediary between them and the image processing devices, a data collection device. This data collection device usually stores a complete list with all of the data on data collection devices, which requires it to have a relatively large memory.

On the other hand, the image processing devices require a diversity of supplies of many different types. The control and prediction of the requirements for providing said supplies is currently performed by a person, which requires a service staff member to decide, based on their experience, when to replace the supplies, as well as carrying out the replacement itself.

Some known controls help the service staff member to determine the correct moment for replacing the supplies. Said controls focus on balancing the cost of unavailability of the device and the cost of the service, including staff expenses, materials and transport costs. Despite this, these controls still require the intervention of a service staff member.

The current reality of the technology of most, if not all image processing devices, is that they have been designed to remain operational without the need for a service staff member, but only through simple physical tasks that are mostly performed by the user. Any user may by a supply, such as a cartridge, without ever talking to a sales person or expert or service person, using an online shop, for example, and can install the supply following the instructions included with the supply. The consequence of not using a service staff member and with current controls is largely affecting existing image processing devices, such as printers, which try to reduce the risk of failure from a lack of supplies and also to minimize the cost of such a service, without achieving this. The user either stores too many supplies and installs them without taking into account the maximum use thereof (i.e., they may install a cartridge before the previous one runs out) or carelessly forgets to buy the supply, and when the current one runs out the device stops working with the resulting cost to the company's production chain. The situation becomes even more complex due to the fact that in a single base of image processing devices there are usually devices of many different models and manufacturers, which means that each one uses different supplies and the devices use them and generate information about them in different ways. In a practical sense, the service staff member should store as many different supply references as there are different models of devices in the company, with the resulting high cost of purchasing them and of managing the complexity of the facilities.

All the above processes use data on the image processing devices. Each data point has an identifier, a label, that allows the control or user to know amongst all the data which is the one that is of interest to them. However, given the large amount of manufacturers and models there is a lot of data and there are even more identifiers, which causes the aforementioned problem. It becomes necessary, as stated in the invention described herein, to homogenize or standardize the data for better management, such as explained below.

DESCRIPTION OF THE INVENTION

The present invention is established and characterized in the independent claims, while the dependent claims describe additional characteristics thereof.

The subject matter of the invention is a procedure and an installation for the control of image processing devices that uses only the data that is necessary, avoiding saturation of the memories of the elements involved and/or the communications bandwidth, meeting the different regulations on data protection and especially the EU GDPR (General Data Protection Regulation), since it avoids collecting data from individuals, and which is simple, universal and reliable so that it does not require an expert user with knowledge of each device or a service staff member. The technical problem to be solved is that of determining the steps of the procedure and configuring the device to obtain the set objective.

In view of the above, this invention relates to a procedure for the control of image processing devices, which usually include supplies that must be replaced when finished.

The image processing devices communicate with a control device via a data collection device provided between the two, that is, there is real time communication between the devices and their control device, which prevents updates in the data collection device, comprising the following steps as known in the state of the art:

a) the data collection device sends a regular query to each image processing device regarding its manufacturer, model and firmware version,
b) each image processing device responds to the query in step a),
c) the data collection device queries the control device on which data it requires from each image processing device,
d) the control device answers the query of step c),
e) the data collection device sends the answer of step d) to each image processing device,
f) each image processing device sends an answer to the query of step e) to the data collection device,
g) the data collection device sends the answers of step f) to the control device.

The procedure is characterized in that, during step g), in the answer to step f) to the control device, the latter only receives the data it has requested, which significantly reduces the data communication with respect to the usual practice in the state of the art, with a reduction of up to 98% or more.

The procedure is also characterized in that the control device comprises a standardization system, which determines the data that must be gathered from each image processing device, which in turn comprises a standardization unit to homogenize the data from each image processing device as explained below, a data supply unit, which rationalizes the communication of the data and uses the previous data standardization, a first storage unit connected to the standardization unit, the control device also comprises a second storage unit.

The standardization of the data is only carried out once for each manufacturer and model, that is, if a certain manufacturer model has already been standardized, the standardization does not occur again. When the data received from step g) is not standardized, it is standardized when the standardization unit is turned on according to the following steps:

h) from the data received in step g), the standardization unit identifies the manufacturer and the model of each image processing device and the data on the manufacturer and the model is saved in the storage unit, i) the standardization unit after step h) requests the profile of the manufacturer of each image processing device through the data collection device that is stored in a second storage unit, the manufacturer's profile contains at least one identifier for each data point, and it is common to query all identifiers despite this not being necessary, and thus the manufacturer's profile is like a list of data points and each one is identified by its identifier, which is unique and is the one that the image processing device that issues it understands, j) each image processing device, via the data collection device, replies to the query from step i), and this can produce three outcomes: that the identifier exists and has a value, that it exists and does not have a value, and that it does not exist; hereinafter we shall consider the case that it exists and has a value, k) the standardization unit after step j) requests data based on the data identifiers from each image processing device via the data collection device, l) each image processing device answers the query of step k) via the data collection device, m) the data received from step l) is stored in the first storage unit, n) the standardization unit, from the data in step m), identifies which identifiers contain a value for its data and checks that the scale of the data is equivalent to a predetermined scale, that is, it contrasts the values obtained for each identifier and disregards any illogical ones, for example, if the datum is "page counter" and the value of an identifier is alphabetical, that identifier is discarded as valid for that model and that datum. This operation is repeated until all but one of the identifiers used according to the manufacturer's profile and for each datum have been disregarded. Once reduced to a single identifier, the system verifies its degree of homogeneity by checking the scale, or in other words, the standardization is performed by considering two different but complementary criteria according to the specific datum: a first criterion is based on the structure of the value, such as for example an IP address: v.x.y.z wherein v, x, y and z are numbers with values comprised between 0 and 254, and therefore the standardization unit, when obtaining in step f) several answers for several identifiers, shall select via known data comparison processes the identifier for which the value obtained is coherent with the values expected, and this is performed for each of the data on the different supplies. The second criterion is used to identify the correct identifiers for each datum on the supplies for the model, for example, depending on the manufacturer there may be one or several possible identifiers. In step f) multiple answers are gathered and the standardization unit discards any that lie outside the range specified in the manufacturer's profile, registering in the model profile the identifiers in which a non-discarded value has been obtained according to the previous criterion. As an option and according to claim 3 a user may make a last check to discard any indicators that may have passed the previous filter but do not provide any valuable data for the datum to be assessed in the model profile, o) the identifiers for each value are stored in the first storage unit as a model profile for each image processing device, discarding the rest of the identifiers such that the model profile contains a maximum of one identifier for each datum existing in the profile.

Steps h) to o) take place when the data is not standardized. It is thus implicitly stated that when the data is not standardized, which is the least common situation, steps h) to o) do not take place; however, with regard to the procedure and the corresponding installation, the remaining steps and elements are valid as stated in detail in the detailed description.

Likewise, the invention relates to an installation for the control of image processing devices, comprising a control device connected to the image processing devices via a data collection device provided between the two, as is known in the state of the art.

The control device is characterized in that it comprises a standardization system that comprises in turn standardization unit linked to a first storage unit and a data supply unit, such that the standardization unit standardizes the data to certain predetermined minimum values.

The main advantage of the procedure and installation is linked to the objective sought, since both use only the data necessary and homogenize this data between different image processing devices regardless of manufacturer or model, and since the steps and configuration are simple and reliable, they also involve a low cost.

Other advantages related to features mentioned in the dependent claims are mentioned in the detailed description below.

BRIEF DESCRIPTION OF THE DRAWINGS

This specification is supplemented with a set of drawings illustrating the preferred embodiment, which are never intended to limit the invention.

DETAILED DESCRIPTION OF THE INVENTION

An embodiment of the invention is described below with reference to the figures.

Figure 1:
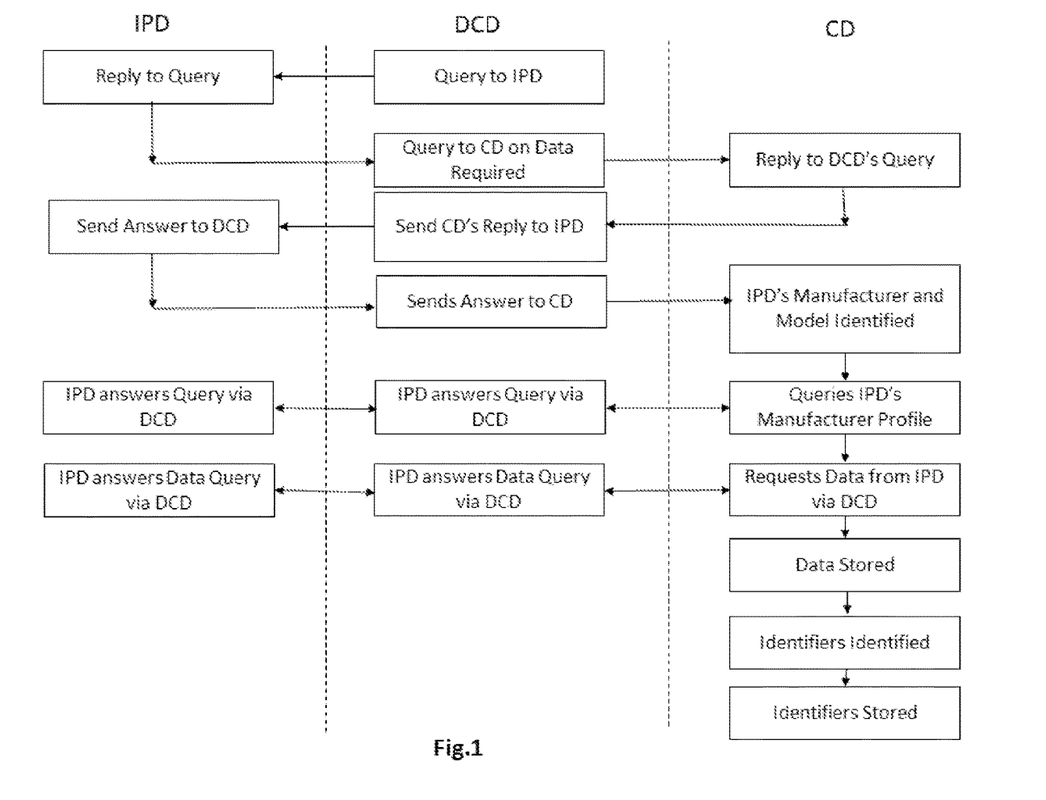
FIG. 1 shows a diagram of the standardization procedure.
Figure 3:
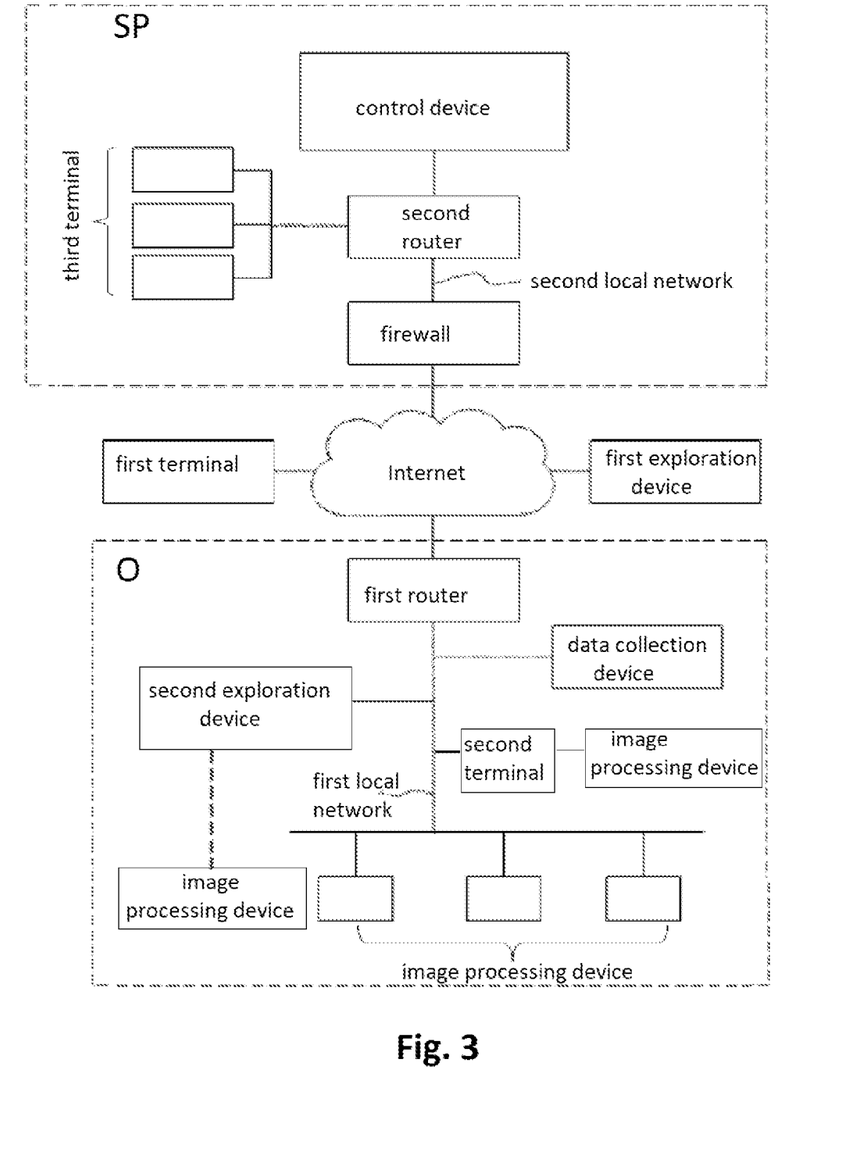
FIG. 3 shows a diagram of the entire installation.

FIG. 1 shows a procedure for the control of image processing devices (1) wherein said devices (1) communicate with a control device (3) via a data collection device (2) provided between the two, which elements are shown in FIG. 3. The image processing devices (1) can be for example a printer, a copier, a fax machine, a plotter, a multifunctional printer or a 3D printer.

The procedure shown in FIG. 1 comprises the following steps, which are shown in different columns depending on the device that performs them: IPD=image processing devices, DCD=data collection device, CD=control device:
a) the data collection device (2) queries each image processing device (1) on its manufacturer, model and firmware version,
b) each image processing device (1) responds to the query from step a),
c) the data collection device (2) queries the control device (3) on which data it requires from each image processing device (1),
d) the control device (3) answers the query of step c),
e) the data collection device (2) sends the answer of step d) to each image processing device (1),
f) each image processing device (1) sends an answer to the query of step e) to the data collection device (2),
g) the data collection device (2) sends the answers of step f) to the control device (3) in the answer from step f) to the control device (3), the latter only receives the data it has requested.

The control device (3) comprises a standardization system (3.1) which in turn comprises a standardization unit (3.2), a data supply unit (3.3), a first storage unit (3.4) linked to the standardization unit (3.2), the control device (3) also comprises a second storage unit (3.5) when the data received from step g) are not standardized, they are standardized by the standardization unit (3.2) according to the following steps:
h) from the data received in step g), the standardization unit (3.2) identifies the manufacturer and the model of each image processing device (1) and the data on the manufacturer and the model is saved in the first storage unit (3.4),
i) the standardization unit (3.2) after step h) queries the manufacturer profile for each image processing device (1) via the data collection device (2), which is stored in a second storage unit (3.5). The manufacturer profile contains at least one identifier for each one of the data points,
j) each image processing device (1) answers the query of step i) via the data collection device (2),
k) the standardization unit (3.2) after step j) requests data based on the data identifiers from each image processing device (1) via the data collection device (2),
l) each image processing device (1) answers the query of step k) via the data collection device (2),
m) the data received from step l) is stored in the first storage unit (3.4),
n) the standardization unit (3.2) for the data of step m), identifies which identifier contains a value for its data and checks that the scale of the data is equivalent to a predetermined scale,
o) the identifiers for each value are stored in the first storage unit (3.4) as a model profile for each image processing device (1).

Preferably, if the scale of the data from step n) is not equivalent the standardization unit (3.2) applies a first algorithm, of several available since new algorithms are usually constantly being generated to cover each specific case in order to approximate said scale to the predetermined scale. The value used in the data is thus is standardized via a first algorithm: $Vn=Ln-FC$, wherein Vn is the standardized value of the identifier at time n of the reading, Ln is the level of the supply corresponding to the relevant data taken at time n, expressed in percentage and collected from the image processing device (1) in that very reading cycle, and FC is the correction factor which is calculated in different ways depending on the circumstance as explained below.

In order to determine the FC factor, when the value Ln gathered from the image processing device (1) does not change over two or more consecutive readings performed in step f, the standardization unit provides an FC value using the following algorithm: $FCn=(Cn-Cn-1)\times(Li-Ln-1)/(Cn-1-Ci)$, and $FC=FCn$ if $FCn<=Ln$, and otherwise $FC=FM$, wherein FM is a value comprised between 100 and 0 and recorded in the model profile by an expert user during the image processing device (1) model standardization process. A second variable for determining the calculation of the correction factor FC is when Ln no longer has a value in its historic series recorded in the first storage unit (3.4) between 100 and 1, and then the standardization unit (3.2) will provide an FC value using the following algorithm: $FC=(Ck-Cn)\times(Vk-1-Li)/(Ck-Ci)$ wherein Ck is the value of the counter at time k in which LN no longer has a logical value as explained, Cn is the value of the last counter available obtained from the image processing device (1) at the time n of the last reading cycle corresponding to step f, Ck is the value of the counter available obtained from the image processing device (1) at time k, Ci is the value of the counter available obtained from the image processing device (1) at the time i in which the supply for the data point being standardized was installed, Vk-1 is the standardized value of the level of the supply at the time before k in which LN no longer had a logical value, Li is the level of the supply corresponding to the relevant data taken at time i in which the supply corresponding to the data point that is being standardized was installed.

In the event that an identifier is missing in the data received from step l) the value corresponding to the latter is calculated via a second algorithm: $Vn=((Cn-Ci)/D)\times 100\times Q$, wherein Vn is the standardized value taken by the identifier at the time n of the reading, Cn is the value of the counter of the image processing device (1) at that very reading cycle, Ci is the value of the same counter at the time in which the supply that corresponds to this identifier was installed in the image processing device (1), D is the durability measured on the same unit as counter Ci of the supply corresponding to that identifier, Qn-1 is a correction coefficient that takes into account the historical durability experienced by the supply corresponding to the data point expressed in base 1; a code shall be assigned to the identifier that can be interpreted in order not to include this identifier in the response that the control device (3) sends in step d); similarly, if the identifier received from step l) exists but does not contain a value, then this shall be calculated via the previous algorithm, and a code shall be assigned to the identifier that can be interpreted in order not to include this identifier in the answer provided by the control device (3) in step d); the second standardization algorithms, each one of them corresponding to each one of the identifier values, are stored in the first storage unit (3.4) as a model profile for each image processing device (1).

From now on the standardized data shall be used, which may have originated from steps h) to o) as described or they could even be available by default without having gone through such steps.

The manufacturer profile in step i) can be of many different types, a common one being the following when the supply is a cartridge, although the relationship between the data and the identifiers varies depending on the model and the manufacturer of the image processing device (1):

| Manufacturer: | |
|---|---|
| Data | Identifiers |
| Serial number | |
| MAC address | |
| Model | |
| Firmware version | |
| Date of firmware | |
| IP address | |
| Counter | |
| Cartridge level | |
| Black | |
| Blue | |
| Red | |
| Yellow | |
| Drum | |
| Fuser unit | |
| Display | |

One option is for a user to check the tolerance of each data identifier, providing any missing data identifier based on their experience, thus completing all the identifiers existing in the model profile such that each and every one of them have a value that is coherent with the data for each identifier. This typically occurs before step m) when the data is processed. The user is usually someone with experience and accesses the control device (3) for example via a third terminal (11) as shown below for installation. A template similar to the profile one is generally used when the supply is a cartridge, although with some additional fields:

| Manufacturer:/Model: | | | | | | | |
|---|---|---|---|---|---|---|---|
| Data | Identifiers | Value | Scale | Standardized scale | Rescaling | Algorithm | Standardized |
| Serial Number or MAC address | | | | | No | | |
| Model | | | | | No | | Ok |
| Firmware version | | | | | | | |
| Date of firmware | | | | | | | |
| IP address | | | | | | | |
| Counter | | | | | No | | Ok |
| Cartridge level | | | | | | | |
| Black | | | | % | | | |
| Blue | | | | % | | | |
| Red | | | | % | | | |
| Yellow | | | | | | | |
| Drum | | | | | No | | Ok |
| Fuser unit | | | | | No | | Ok |
| Display | | | | | No | | Ok |

Another option is that after step o) the data supply unit (3.3) identifies the profile of the standardized model and checks if there is a specific standardized profile for this specific image processing device (1), that is, that the profile contains a unique identifier that coincides with the serial number or MAC address of the image processing device (1). In this case, it compares them with the firmware version collected in step a), and if they are the same the data supply unit (3.3) identifies said profile, if there is no coincidence the data supply unit (3.3) identifies the most current profile of the firmware collected in step a). The profile of the image processing device (1) has the peculiarity with respect to the standardized model profile that a user, previously or at any time, has introduced a specific and different algorithm for a specific datum into the profile of the standardized model. This solves the problem of using supplies in the image processing device (1) that have not been manufactured by the same manufacturer of the device itself, and for which therefore, the image processing device (1) when it answers in step f), would have answered with an answer that would have been different had it been using the same supply manufactured by the same manufacturer as the image processing device (1).

Another option is that prior to step a) the data collection device (2) explores the local network to which the image processing devices (1) are connected in order to locate them according to known protocols, and thus the communication only occurs with image processing devices (1) and not with other types of devices, and thus prevents an unnecessary flow of data; in the event that an image processing device (1) is not found in the network a user may access its data through an interface and manually introduce them into the control device (3).

Figure 2:
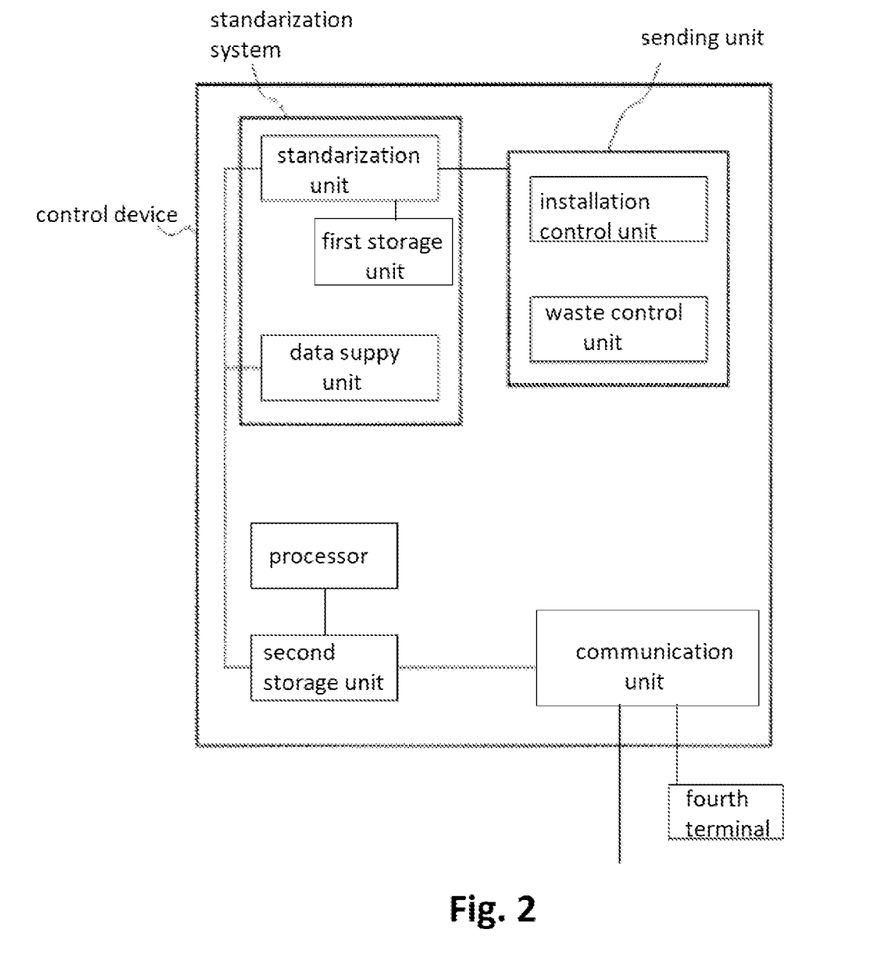
FIG. 2 shows a diagram of the installation showing the control device in particular.

FIG. 2 shows an installation for the control for image processing devices (1) comprising a control device (3) connected to same via a data collection device (2) provided between them both, the control device (3) comprising a standardisation system (3.1) which in turn comprises a standardisation unit (3.2) connected to a first storage unit (3.4) and to a data supply unit (3.3) such that the standardisation unit (3.2) standardises the data to certain predetermined minimum values.

One option is for the control device (3) to also include a second storage unit (3.5) connected to a communication unit (3.6) and to a processor (3.7), all of which are connected to the standardisation system (3.1), which is in turn connected to a sending unit (3.8) which in turn comprises an installation control unit (3.9) and a waste control unit (3.10). Optionally a fourth terminal (3.11) can be connected to the communication unit (3.6).

The purpose of the installation control unit (3.9) is to automatically identify when a supply for which the control device (3) has identified to require being replaced due to its useful life being near completed, has been installed in the image processing device (1). This is important since the image processing devices (1) require supplies that are replaced entirely, and cannot be refilled by the user. Consequently, when a supply is replaced, the remaining operating capacity thereof is a waste that adds cost to the activity, over a global operational calculation, performed by the image processing device (1) and also means a source for the generation of $CO_2$ and other contaminants due to the non-optimal use. On the other hand, since the installation of supplies is mainly performed by the user, it is impractical to expect the user to communicate to the control device (3) when they have performed said activity. Therefore, the installation control unit (3.9) automatically identifies when a supply has been installed as explained below.

Therefore, after receiving the data from the image processing device (1) via the data collection device (2), the control device (3) records the data after it has been standardized using the model profile as explained above. The installation control unit (3.9) then checks if there is an alert record marked as "pending installation" sent for any of the data for this image processing device (1), and if there is it performs the following check: Data value>VC×100, wherein Data value is the last standardized value recorded for the relevant data and VC is a parameter between 1 and 0.5 indicated in the model profile for that image processing device (1). If the answer is "true", then the installation control unit (3.9) marks the alert as "installed" and activates the waste control unit (3.10). If the answer is "false", then the alert remains as "pending installation".

The waste control unit (3.10) can evaluate the waste occurring when a supply that was in use is replaced by a new one. Thus, when an alert is marked as "Installed" the waste control unit (3.10) recovers the last record with a standardized value for the data prior to the moment in which the alert is recorded as "installed", by applying the following fifth algorithm: Waste=$(C_{n+1}-C_n) \times (100-N_n)/(C_n-C_i)+(100-N_n+1)$ wherein: $C_{n+1}$ is a counter for the image processing device (1) at the time of the last data reading, $C_n$ is a counter for the image processing device (1) at the time of data reading before the last one, $N_n$ is the standardized level of the data at the time of the data reading before the last, $N_{n+1}$ is the standardized level of the data at the time of the last data reading, $C_i$ is a counter for the image processing device (1) at the time of the installation of the supply that was just replaced, with a result equal to the waste in percentage (%) of supply wasted at the time of the replacement.

Another option is that the waste control unit (3.10) may collect the last record of the standardized value of the data prior to the time at which the alert is recorded as "Installed", and applies the following sixth algorithm when the image processing device (1) is a printer and the data are the pages: Pages wasted=(Wasted× $P_{imp}$)/($N_n-N_i$), $P_{imp}$=$C_n-C_i$, Waste=$(C_{n+1}-C_n) \times (100-N_n)/(C_n-C_i)+(100-N_{n+1})$ wherein: $C_{n+1}$ is a counter for the image processing device (1) at the time of last data reading, $C_n$ is a counter for the image processing device (1) at the time of the data reading before last, of the data reading before the last, $N_n$ is the standardized level of the data at the time of the reading of data before last, $N_{n+1}$ is the standardized level of the data at the time of the last data reading, $N_i$ is the standardized level of the data at the time of installation of the supply (cartridge) that was just replaced, $C_i$ is a counter for the image processing device (1) at the time of the installation of the supply that was just replaced, resulting in the number of pages wasted that the image processing device (1) could have printed had the supply not been replaced at time n and if it had been replaced when it was truly empty.

Preferably and as usual, the control device (3) and the data collection device (2) are connected over the internet (I).

Another option of the installation is for a first exploration device (4) and/or a first terminal (5) are connected to the control device (3) and to the data collection device (2) over the internet (I). This first exploration device (4) and first terminal (5) have the advantage that they are arranged outside any local network and communicate with the control device (3) over the internet (I).

Preferably, the image processing devices (1) and the data collection device (2) are connected to one another via a first local network (6). Thus, with a common network they can access the control device (3) over the internet (I).

One option is that a second exploration device (7) is connected to the first local network (6). Specifically, and as an alternative to the aforementioned first local network (6), an image processing device (1) is connected to the second exploration device (7) over the internet (I). These are known as offline printers. This is advantageous when the image processing device (1) does not have access to the first local network (6). In particular, a user may access the image processing device (1) via a suitable interface (keyboard, screen, etc.) and even by scanning a QR code, accessing a list of data that they could fill out. This is especially useful in equipment that is located in faraway geographical areas that can only be accessed over an internet (I) connection and they can also be accessed by any user, without it having to be an expert. On advantageous option is for the access to include online technical support, as well as the possibility of requesting a supply this way, and then the control device (3) records the request and prevents the request from being duplicated if, for example, another user performs the same request, and it can also include counters for cartridge consumption, such as the number of pages or the percentage of an ink cartridge.

Another alternative is for an image processing device (1) to be connected to the first local network (6) via a second terminal (8), which communicates with the control device (3) for data entry, queries and any functionality it is capable of.

Optionally, the internet (I) connection of the data collection device (2) is performed through a first router (9) and the internet (I) connection of the control device (3) is performed through a second router (10). Also, said second router (10) may be connected to a third terminal (11) and optionally a firewall (12), which combined protect the data flow from undesirable external attacks.

The control device (3) and/or the first router (9), the third terminal (11) and the firewall (12) can be connected via a second local network (13) such that they together form what is usually called a services provider, "SP" in FIG. 3.

During operation, the control device (3) logs the records for the standardized data for each one of the image processing devices (1). The logs include the date, hour, minute and seconds in which the values are received at the control device (3) via the data collection device (2). Periodically, multiple times a day and at the most once each time the data is received and standardized, the sending unit (3.8) identifies the immediate needs of the image processing device (1). The detailed identification is explained in detail below, and here we shall provide a brief description mentioning some of the elements of the installation involved: when the standardized value of a data exceeds the value of a predetermined threshold, fixed and previously introduced by an operator using a third terminal (11), the sending unit (3.8) generates an alert indicating that such data has reached the threshold value. The alert is then registered in the first storage unit (3.4) indicating the date, hour, minute and second thereof, as well as the value of the data at that instant, and its status is marked as "pending installation". If when the previous criterion of the data reaching or exceeding the threshold value is met and there is a previous alert with the "pending installation" status, then the sending unit (3.8) does not perform any action. The control device (3) thus is guaranteed to only notify once when a supply is required, and therefore prevents duplicate supplies to be sent, which is very common in other solutions provided in the industry. As a result of the above, the sending of the supplies can be automated by sending the data for the supply required at a certain image processing device (1) to an external delivery management system, thus achieving a great increase in productivity and an improved control of the resources that are sent to each image processing device (1).

In one variant, the sending alert occurs when a standardized data for a certain image processing device (1) and previously converted by the sending unit (3.8) to a value expressed in time units (weeks, days, hours, minutes and seconds) reaches a threshold that the operator has previously introduced as "time remaining" units. The operation is the following: The system records the log of standardized data for each one of the image processing devices (1), which records are logged using the reference of the date, hour, minute and seconds in which the values are received at the control device (3) via the data collection device (2). Periodically, multiple times a day and at the most once each time the data is received and standardized, the sending unit (3.8) performs prediction calculations for the evolution of consumption for each supply of the image processing device (1), which prediction is carried out using the different time stamps and applying a third algorithm that accounts for the possible changes in the rhythm of use for the image processing devices (1). The advantage of this solution is that it reduces the risk of an unusual behaviour of the image processing device (1) altering the prediction of time remaining, for example, for the printing capacity remaining for each cartridge, which is what happens when a linear prediction is made as in other known solutions. The third algorithm is the following: $TR=(L_n \times d)/(|L_n-L_{n-d}|) \times 1/FC_n$, $FC=((C_n-C_{n-D})/D)/((C_n-C_{n-d})/d)$, wherein $FC_n=1$ if $FC<1$, $FC_n=FC$ if $FC>=1$, $FC_n$ is the Correction Factor at time "n" of the alert, TR is time remaining, $L_n$ is the standardized value of the data level (level of the relevant supply) at time "n" of the alert, $L_{n-d}$ is the standardized value of the data level (level of the relevant supply) at time "n" of the alert minus a period of time "d", $C_n$ is the counter for the image processing device obtained at time "n" of the alert, $C_{n-d}$ is the counter for the image processing device at time "n" of the alert minus a period of time "d", $C_{n-D}$ is the counter for the image processing device at time "n" of the alert minus a period of time "D", d is the period of time (expressed in any time unit such as weeks or days, hours, minutes . . . ), D is the period of time (expressed in any time unit such as weeks or days, hours, minutes . . . ) and D is always greater than d.

In another variant, the sending alert occurs when a standardized data for a certain image processing device (1) and previously converted by the sending unit (3.8) to a value expressed in "printed pages remaining" reaches a threshold that the operator has previously introduced as "printed pages remaining" units. The operation is the following: the log of standardized data for each one of the image processing devices (1) is recorded, which records are logged using the reference of the date, hour, minute and seconds in which the values are received at the control device (3) via the data collection device (2), as well as the value of the counter or counters at that time. Periodically, multiple times a day and at the most once each time the data is received and standardized, the sending unit (3.8) performs prediction calculations for the evolution of consumption for each supply of the image processing device (1), which prediction is carried out using the different time stamps and applying a fourth algorithm that accounts for the possible changes in the rhythm of use for the image processing devices (1). The advantage of this solution is that it reduces the risk of an uncommon behavior in the image processing device (1) from altering the prediction for the remaining print capability of each supply. On the other hand, this method may replace the one indicated above that is based on "time remaining" or it may complement it to improve the process of sending supplies to image processing devices (1) in production. The fourth algorithm is the following when the image processing device (1) is a printer and the data is pages: Pages Expected=$(L_d \times (C_n-C_{n-d})/|L_d-L_{n-d}|$, wherein $L_n$ is the standardized value of the level of the data (level of relevant supply) at time "n" of the alert, $C_n$ is a counter for the image processing device obtained at time "n" of the alert, $C_{n-d}$ is a counter for the image processing device obtained at time "n" of the alert minus the period a period of time "d", $L_{n-d}$ is a standardized value of the level of the data (level of relevant supply) at time "n" of the alert minus a time period "d".

The image processing devices (1) and the data collection device (2) that are connected to one another via a first local network (6) form together with other nearby devices: the first router (9), the second exploration device (7), the second terminal (8), that is usually considered the operator for the image processing devices (1), "O" in FIG. 3.

The components of the aforementioned elements are standard and with their usual capacities. For example, an image processing device (1) comprises a communication unit, a data storage unit, a processor and supplies: ink cans, paper, fuser unit, cartridges for material, etc.; the data collection device (2) comprises a communication unit, a data storage unit and a processor; an exploration device (4.7) comprises a communication unit, a data storage unit, a processor, an interface (display, keyboard) and a camera.

For the procedure and the installation access permissions are of the usual type, and it is advantageous to use a single data collection device (2) such that said permissions are centralised there, and thus if an image processing device (1) is removed from the installation and/or another one is added this can be done in a simple manner by acting only on the data collection device (2), in contrast to when there is one per image processing device (1), which requires individual updating, which is complex and very time consuming.

What is claimed:

1. A procedure for controlling image processing devices wherein said image processing devices communicate with a control device via a data collection device provided between the image processing devices and the control device, such procedure comprising the following steps:
   a) the data collection device queries each image processing device on its manufacturer, model and firmware version;
   b) each image processing device responds to the query from step a);
   c) the data collection device queries the control device on data the control device requires from each image processing device;
   d) the control device answers the query of step c);
   e) the data collection device sends the answer of step d) to each image processing device;
   f) each image processing device sends an answer to the query of step e) to the data collection device;
   g) the data collection device sends the answers of step f) to the control device, characterized in that in the answer from step f) to the control device, the control device only receives the data the control device has requested, wherein the control device comprises a standardization system, the standardization system comprising a standardization unit, a data supply unit, and a first storage unit connected to the standardization unit, wherein the control device further comprises a second storage unit, when the data received from step g) is not standardized, the data is standardized by the standardization unit according to the following steps:

h) from the data received in step g), the standardization unit identifies the manufacturer and the model of each image processing device, the data on the manufacturer and the model is saved in the first storage unit;

i) the standardization unit after step h) queries the manufacturer profile for each image processing device via the data collection device, the manufacturer profile is stored in the second storage unit, the manufacturer profile contains at least one identifier for each one of the data points;

j) each image processing device answers the query of step i) via the data collection device;

k) the standardization unit after step j) requests data based on the data identifiers from each image processing device via the data collection device;

l) each image processing device answers the query of step k) via the data collection device;

m) the data received from step l) is stored in the first storage unit;

n) the standardization unit for the data of step m), identifies which identifier contains a value for its data and checks that the scale of the data is equivalent to a predetermined scale; and o) the identifiers for each value are stored in the first storage unit as a model profile for each image processing device, wherein the data supply unit identifies the standardized model profile and checks whether or not there is a specific standardized profile for the image processing device, in particular by containing a unique identifier that coincides with the serial number or media access control address of the image processing device, in which case it compares it to the firmware version obtained in step a), and if these coincide the data supply unit identifies said profile, and if they do not coincide the data supply unit identifies the most current firmware profile obtained in step a).

2. The procedure as claimed in claim 1, wherein if the scale of the data from the step n) is not equivalent, the standardization unit applies a first algorithm to approximate said scale to the predetermined one: $Vn=Ln-FC$, wherein:

Vn is the standardized value of the identifier at time n of the reading,

Ln is the level of the supply corresponding to the relevant data taken at time n, expressed in percentage and collected from the image processing device in that very reading cycle, and FC is a correction factor.

3. The procedure as claimed in claim 1, wherein in the event that the data from step l) is missing an identifier, the identifier is calculated via a second algorithm: $Vn=((Cn-Ci)/D) \times 100 \times Q$, wherein:

Vn is the standardized value taken by the identifier at the time n of the reading, Cn is the value of the counter of the image processing device at that very reading cycle, Ci is the value of the same counter at the time in which the supply that corresponds to this identifier was installed in the image processing device, D is the durability measured on the same unit as counter Ci of the supply corresponding to that identifier, and $Q_{n-1}$ is a correction coefficient that takes into account the historical durability experienced by the supply corresponding to the data point expressed in base 1;

further a code is assigned to the identifier that can be interpreted in order not to include this identifier in the response that the control device sends in step d).

4. The procedure as claimed in claim 1, wherein a user checks the tolerance of each data identifier, providing any missing data identifier based on their experience, thus completing all the identifiers existing in the model profile such that each and every one of them have a value that is coherent with the data for each identifier.

5. The procedure as claimed in claim 1, wherein before step a) the data collection device explores the local network to which the image processing devices are connected to locate them using known protocols; in the event that an image processing device is not found in a network a user may access its data via an interface and introduce it manually in the control device.

6. The procedure as claimed in claim 1, wherein a sending unit connected to the standardization system identifies the upcoming needs of the image processing device, for which the control device records the log of the standardized data for each image processing device, which records include the date, hour, minute and seconds at which the values are received at the control device from the data collection device; periodically, multiple times a day and at the most once each time the data is received and standardized, the sending unit identifies the immediate needs of the image processing device, which consists in the following: when the standardized value of a data point exceeds the value of a predetermined threshold that has been fixed and previously introduced by an operator via a third terminal, the sending unit generates an alert indicating that such data point has reached the value of the threshold, which alert is registered in the first storage unit indicating the date, hour, minute and second thereof, as well as the value of the data point at that moment, and its status is marked as "pending installation"; if when the previous criteria of the data having reached or exceeded the threshold value is met there has been a previous alert and the status is already "pending installation", then the sending unit performs no action.

7. The procedure as claimed in claim 1, wherein a sending unit connected to the standardization system identifies the upcoming needs of the image processing device, for which the control device records the log of the standardized data for each image processing device, which records include the date, hour, minute and seconds at which the values are received at the control device from the data collection device; periodically, multiple times a day and at the most once each time the data is received and standardized, the sending unit identifies the immediate needs of the image processing device, which consists in the following: the sending unit performs prediction calculations for the evolution of consumption for each supply of the image processing device, which prediction is carried out using the different time stamps and applying a third algorithm that accounts for the possible changes in the rhythm of use of the image processing devices; wherein the third algorithm is the following:

$TR=(Ln \times d)/(|Ln-Ln-d|) \times 1/FCn$, $FC=((Cn-Cn-D)/D)/((Cn-Cn-d)/d)$, wherein:

FCn=1 if FC<1,

FCn=FC if FC>=1,

FCn is the Correction Factor at time "n" of the alert,

TR is time remaining, $L_n$ is the standardized value of the data level at time "n" of the alert, $L_{n-d}$ is the standardized value of the data level at time "n" of the alert minus a period of time "d", $C_n$ is the counter for the image processing device obtained at time "n" of the alert, $C_{n-d}$ is the counter for the image processing device at time "n" of the alert minus a period of time "d", $C_{n-D}$ is the counter for the image processing device at time "n" of the alert minus a period of time "D", d is the period of time, and D is the period of time, and D is greater than d.

8. The procedure as claimed in claim 1, wherein a sending unit connected to the standardization system identifies the upcoming needs of the image processing device, for which the control device records the log of the standardized data for each image processing device, which records include the date, hour, minute and seconds at which the values are received at the control device from the data collection device; periodically, multiple times a day and at the most once each time the data is received and standardized, the sending unit identifies the immediate needs of the image processing device, which consists in the following: the sending unit performs prediction calculations for the evolution of consumption for each supply of the image processing device, which prediction is carried out using the different time stamps and applying a fourth algorithm that accounts for the possible changes in the rhythm of use of the image processing devices; the fourth algorithm is the following: $(L_d \times (C_n - C_{n-d})/|L_d - L_{n-d}|$, wherein:

$L_n$ is the standardized value of the level of the data at time "n" of the alert, $C_n$ is a counter for the image processing device obtained at time "n" of the alert, $C_{n-d}$ is a counter for the image processing device obtained at time "n" of the alert minus the period a period of time "d", and $L_{n-d}$ is a standardized value of the level of the data at time "n" of the alert minus a time period "d".

9. The procedure as claimed in claim 1, wherein an installation control unit connected to the standardization system checks if there is an alert record marked as "pending installation" sent for any of the data for this image processing device and if there is it performs the following check: Data value>VC×100, wherein Data value is the last standardized value recorded for the relevant data point and VC is a parameter between 1 and 0.5 indicated in the model profile for that image processing device, if the answer is: "true", then the installation control unit marks the alert as "installed" and activates a waste control unit that is also connected to the standardization system; if the answer is: "false", then the alert remains as "pending installation".

10. The procedure as claimed in claim 9, wherein the waste control unit recovers the last record with a standardized value for the data point prior to the moment in which the alert is recorded as "installed", by applying the following fifth algorithm: $Waste = (C_{n+1} - C_n) \times (100 - N_n)/(C_n - C_i) + (100 - N_{n+1})$ wherein:

$C_{n+1}$ is a counter for the image processing device at the time of the last data reading, $C_n$ is a counter for the image processing device at the time of data reading before the last one, $N_n$ is the standardized level of the data at the time of the data reading before the last, and $N_{n+1}$ is the standardized level of the data at the time of the last data reading, $C_i$ is a counter for the image processing device at the time of the installation of the supply that was just replaced, with a result equal to the waste in percentage (%) of supply wasted at the time of the replacement.

11. The procedure as claimed in claim 9, wherein the waste control unit obtains the last record of the standardized value for the data point prior to the time at which the alert is recorded as "Installed", and applies the following sixth algorithm when the image processing device is a printer and the data point is pages: Pages wasted=$(Wasted \times Pimp)/(N_n - N_i)$, $Pimp = C_n - C_i$, $Waste = (C_{n+1}C_n) \times (100 - N_n)/(C_n - C_i) + (100 - N_{n+1})$ wherein:

$C_{n+1}$ is a counter for the image processing device at the time of last data reading, $C_n$ is a counter for the image processing device at the time of the data reading before last, of the data reading before the last, $N_n$ is the standardized level of the data at the time of the reading of data before last, $N_{n+1}$ is the standardized level of the data at the time of the last data reading, $N_i$ is the standardized level of the data at the time of installation of the supply that was just replaced, and $C_i$ is a counter for the image processing device at the time of the installation of the supply that was just replaced, resulting in the number of pages wasted that the image processing device could have printed had the supply not been replaced at time n and if it had been replaced when it was truly empty.

12. The procedure claimed in claim 1, wherein in the event that the data from step 1) includes an identifier but does not contain a value, the value of the identifier is calculated via a second algorithm: $V_n = ((C_n - C_i)/D) \times 100 \times Q$, wherein:

$V_n$ is the standardized value taken by the identifier at the time n of the reading, $C_n$ is the value of the counter of the image processing device at that very reading cycle, $C_i$ is the value of the same counter at the time in which the supply that corresponds to this identifier was installed in the image processing device, D is the durability measured on the same unit as counter $C_i$ of the supply corresponding to that identifier, and $Q_{n-1}$ is a correction coefficient that takes into account the historical durability experienced by the supply corresponding to the data point expressed in base 1; further a code is assigned to the identifier that can be interpreted in order not to include this identifier in the answer provided by the control device in step d); the second standardization algorithms, each corresponding to each of the values of the identifiers, are stored in a first storage unit as a model profile for each image processing device.

* * * * *